United States Patent [19]

St. Clair et al.

[11] 3,937,048

[45] Feb. 10, 1976

[54] METHODS AND APPARATUS FOR PROVING GAS METERS

[75] Inventors: Theodore A. St. Clair, Fairfield; Richard K. Weltz, Southbury; Henry T. Yaglowski, Bridgeport, all of Conn.

[73] Assignee: Textron Inc., Providence, R.I.

[22] Filed: Dec. 5, 1974

[21] Appl. No.: 529,947

[52] U.S. Cl. ..................... 73/3
[51] Int. Cl.² .................. G01F 25/00
[58] Field of Search .................. 73/3

[56] References Cited
UNITED STATES PATENTS

| | | | |
|---|---|---|---|
| 2,931,216 | 4/1960 | Rauth | 73/3 |
| 3,035,434 | 5/1962 | St. Clair | 73/3 |
| 3,063,284 | 11/1962 | Ott | 73/3 |
| 3,605,480 | 9/1971 | St. Clair | 73/3 |

*Primary Examiner*—S. Clement Swisher
*Attorney, Agent, or Firm*—Arthur A. Johnson

[57] ABSTRACT

There is disclosed methods and apparatus for proving fluid meters, particularly gas meters of the positive displacement, diaphragm-operated type in which the number of cycles of operations of the valve mechanism of the meter is used as a factor in proving the accuracy of the meter, the number of said cycles being determined by sensing a series of pressure waveforms in the test gas entering and leaving the diaphragm chambers of the meter, which waveforms are characteristic of the particular meter being tested and occur in each cycle and reoccuring cycle of operation of the meter when operating, detecting a characteristic waveform in each series of waveforms, amplifying and shaping the characteristic waveform and counting a predetermined number of cycles of said waveforms and comparing the volume of test gas which has passed through the meter as measured by a test bell with the amount that should have passed during that predetermined number of cycles of operations of the meter. The proving of the gas meter by the bell method may be carried out with negative pressure to determine gas drawn through the meter or by positive pressure by forcing gas through the meter. To carry out the above method of proving a meter, there is provided by the present invention improved apparatus for performing the proving operations in which the various valves, provided for the purpose, are operated by solenoids controlled by electronic means including a time controlled function selector, function performing circuits, a shift register for causing the functions to be performed consecutively and a malfunction detector.

33 Claims, 15 Drawing Figures

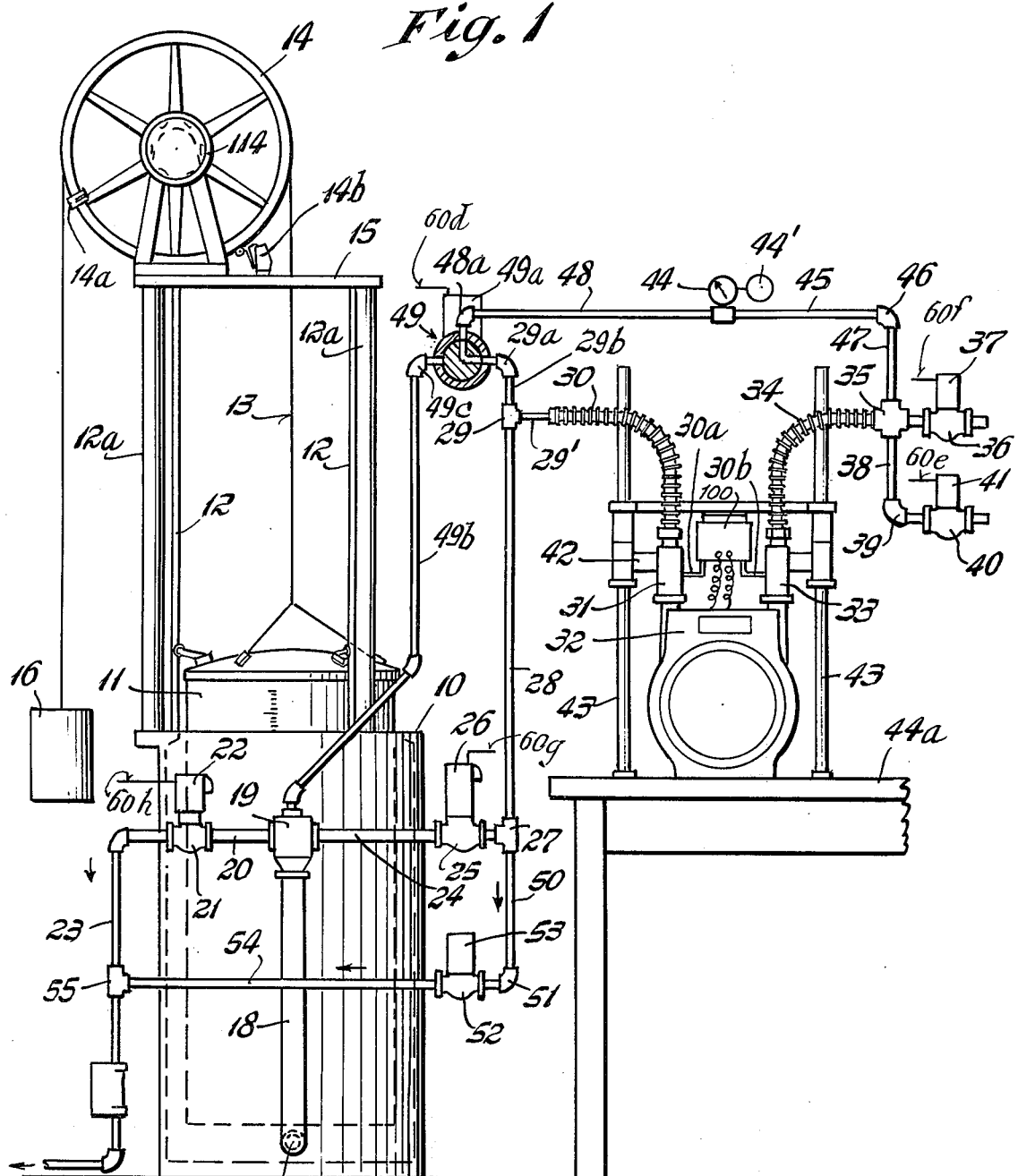
Fig. 1
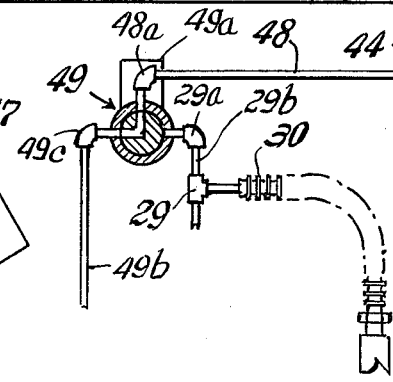
Fig. 2
Fig. 3

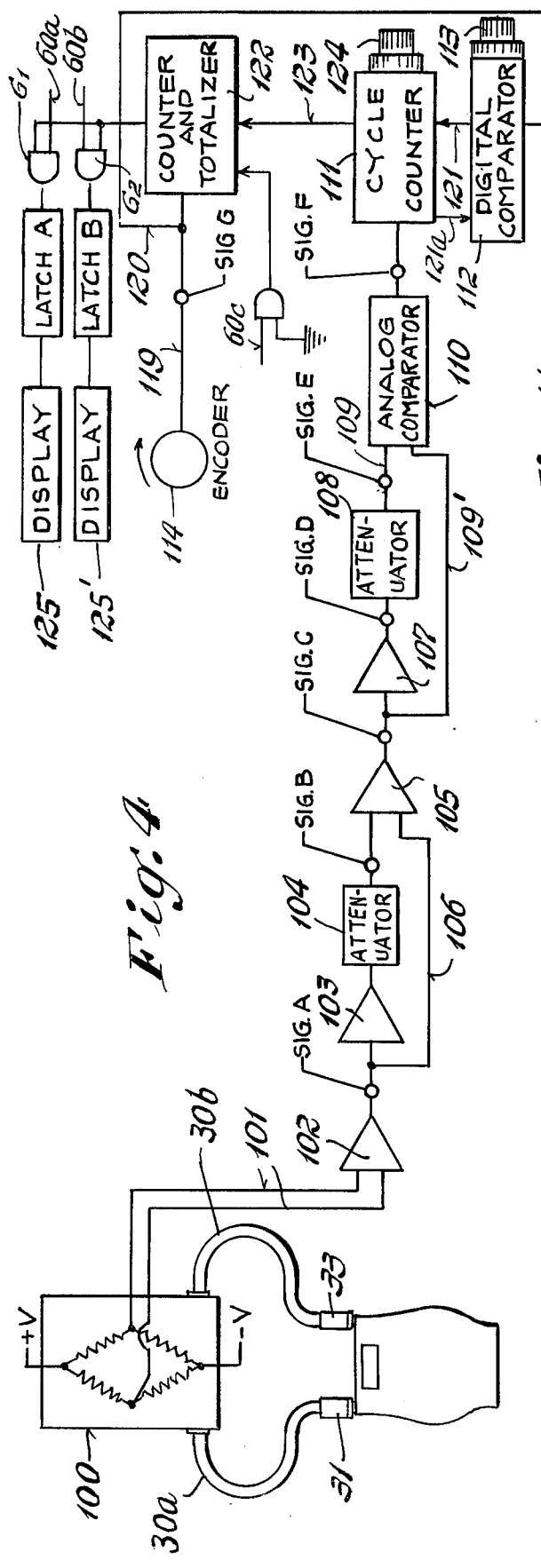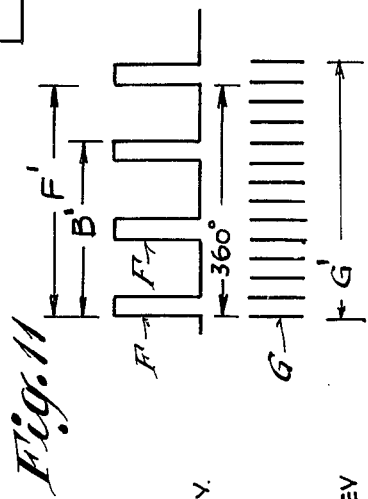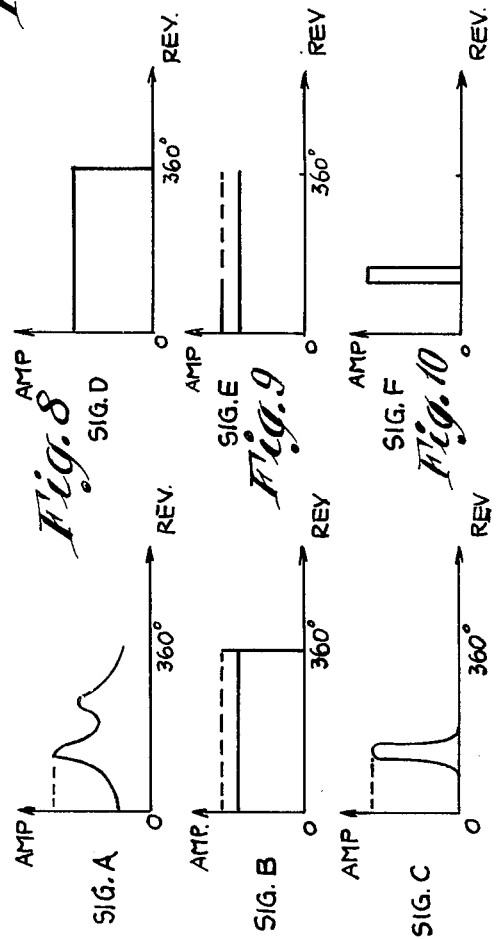

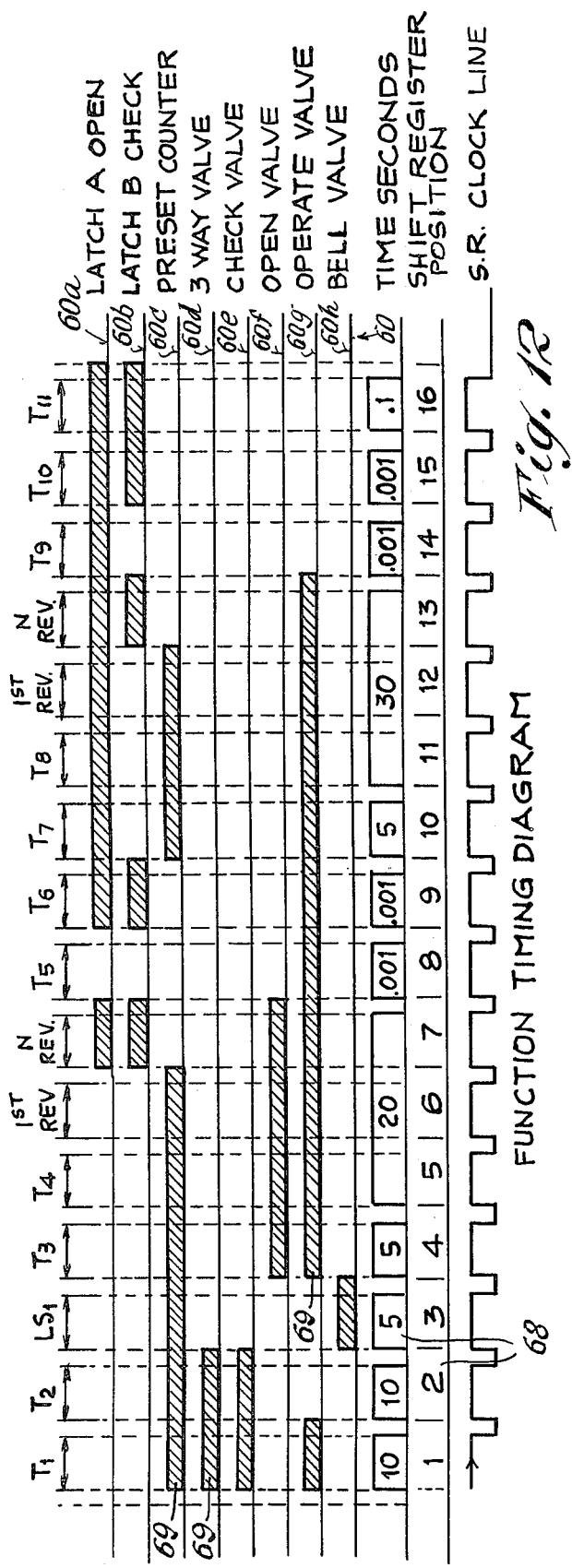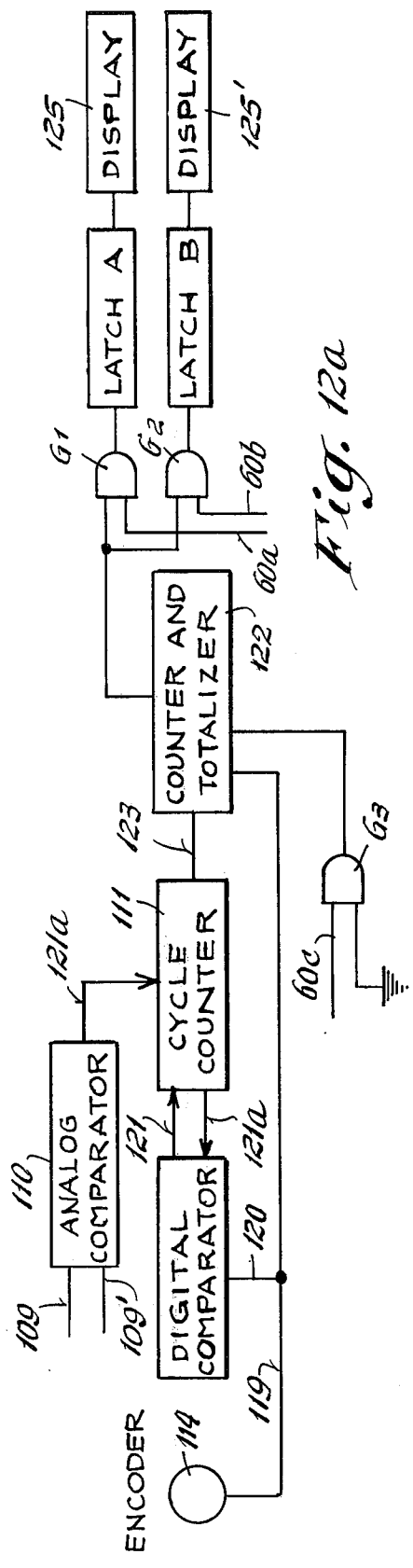

METHODS AND APPARATUS FOR PROVING GAS METERS

This invention relates to improved methods and apparatus for proving the accuracy of positive displacement, diaphragm-operated volumetric fluid meters, and more particularly gas meters of that type.

Heretofore it has been the practice to test gas meters of the positive displacement, diaphragm-operated type by supplying the meter with test gas which may be air or other inert gas, such as nitrogen, causing the meter to rotate through a precise number of cycles of operation as indicated by a complete revolution of the proving hand on the meter index and reading on the prover the volume of test gas displayed in said cycles of operation, the proof then being the relationship between the volume indicated by the proving dial of the meter and the volume indicated by the prover. In such method and with such means a substantial amount of time was required to flow the large quantity of test gas through the meter to obtain a usable reading of the proving hand of the meter index. For instance, heretofore such tests required use of two cubic feet of test gas measured by a scale or other volume encoder on a test bell so as to produce a readable display of the amount of test gas passing through the meter and comparing it with the reading of the meter's proving hand.

Besides, during such a test the condition of the test gas was subject to change, due to changes in ambient temperature and atmospheric pressure, thus making the accuracy of the test somewhat questionable. Therefore, it was extremely advantageous to substantially reduce the time required to make a complete test, especially when it is realized that usually the meter is separately tested under high and low flow conditions and that quite frequently adjustment of the meter valve mechanism must be made and the meter retested.

Due to variations in the manufacture and assembly of the meter, particularly in the drive means between the diaphragm and the index, there are differences in the performance of otherwise similar meters which would render the showing on the index of the meter inaccurate to an extent frequently sufficient to require readjustment of the meter before shipment to the consumer. Because of wear of the parts during prolonged periods of use, local ordinances require meters to be tested and adjusted after stated periods of time.

The importance of facilitating these testing operations so as to improve the accuracy of the test and reducing the testing time is apparent both from the viewpoint of the manufacturer and consumer.

Since the inaccuracies referred to above in the same meter are different under different conditions of flow of the test gas, it is usual to make two test runs on each meter being tested. One such test run referred to as an "open" test is conducted under maximum flow conditions and another such test run known as a "check" test is performed under reduced flow of test gas.

An object of this invention is to provide improved methods and apparatus for substantially reducing the time required to make the tests on a meter and to thereby make the tests more economically and more accurately. This is accomplished, according to the present invention, by providing methods and means whereby only a small fraction of the amount of test gas heretofore needed to conduct the test is now required to complete the test, and the reliability of the test is greatly improved.

This invention is based on the discovery that in each cycle of operations of the valve mechanism of the meter there are variable differences in pressure of the test gas between the inlet and outlet orifices of the meter and there is thereby produced a series of pressure fluctuations forming an explicit waveform train for each cycle of operation of the meter valve mechanism and that in each such train there is one, and with some meters more than one characteristic peak which are substantially the same in each reoccurring waveform train, and that said peaks may be sensed and the characteristic peak or peaks may be amplified, detected, and shaped to operate means for counting the number of cycles of the meter valve mechanism made during each test run to mark the termination of that particular test run.

The volume of test gas passing through the meter can be determined by the linear movement of a test bell, by means of an optical digital encoder operated by the test bell to produce a signal for each predeterminate unit of test gas used in a test run. The accuracy or the extent of inaccuracy of the meter is proved by noting the volume of test gas which has passed through the meter when the valve mechanism of the meter has made a predetermined number of cycles of operation and comparing it with the volume intended to be passed through the meter.

The difference between the patterns of the waveforms in different meters of the same construction is unimportant since the characteristic peak or peaks are used solely to count and limit the number of cycles of operation of the meter for each test run.

In the broader aspects of this invention any suitable means may be used to sequentially operate the valves for controlling the passage of gas through the meter while it is being tested. One such means is disclosed in U.S. Pat. No. 3,035,434, wherein electromechanical means comprising a rotatable program drum controls circuits to open and close the necessary solenoid valves seriatim according to the predetermined plan.

As disclosed in said patent the meter is proved by noting the amount of test gas which has passed through the bell at the end of a series of operations of the meter and comparing it with the reading of the meter's index device. But, according to the present invention, the proof of the meter under test depends on the utilization of said inherent characteristic of a diaphragm-operated volumetric gas meter, to wit, that in operation of such gas meters the pressure conditions within the diaphragm chambers in one cycle of operation are not uniform, but consist rather of a series of pressure waveforms or fluctuations of non-uniform amplitude including, in a meter having three diaphragm chambers, one characteristic waveform peak of greater amplitude than the others. One complete rotational cycle of a meter produces a family or train of pressure waveforms including said characteristic peak, which at constant flow rate produce the same waveform family in successive cycles.

With some meters, due to the number of diaphragm chambers therein, there may be more than one characteristic peak and this is taken into consideration in proving the meter.

In reliance upon the above-stated phenomenon of the pressure peaks occurring in the diaphragm chambers, the present invention provides means for sensing one or more characteristic pressure peaks occurring in each complete cycle of operation of the meter, whereby the number of cycles of a gas meter may be monitored and the test terminated when a predetermined number of cycles of operations of the meter has taken place. The volume of test gas intended to be passed through the meter in each test being known, by comparing the volume of test gas actually passed through the meter with said known volume, it can be quickly determined whether or not the correct volume of test gas has passed through the meter in a predetermined number of cycles.

This is accomplished, according to the present invention, by placing in communication with the test gas entering and leaving the diaphragm chambers a transducer which is responsive to the fluctuation in the pressure of the gas at the inlet and outlet orifices of the meter and which transducer generates a series or train of electrical signals repeated in each successive revolution of the valve mechanism of the meter. The signals which are rather feeble are first fed to a differential amplifier to increase the voltage to a level that can be used and processed further to obtain the desired signal control. From the first differential amplifier the undulating signal is passed to a first peak detector and is held at peak value. A peak value signal is then passed through an attenuator to a second differential amplifier which also receives the time varying signal directly from the first differential amplifier so that the attenuated signal is superposed on said time varying signal. The output from the second differential amplifier which amplifies the difference between the maximum output of the first differential is fed to a second peak detector amplifier whose output is attenuated and transmitted to an analog comparator which also receives signals from the second differential amplifier.

The waveforms representing a cycle of operations of the valve mechanism of the meter may vary in amplitude by several volts. To insure that the analog comparator produces a signal each and every time for the same peak output of the peak amplifier, the level of the attenuator signal is lowered further to a predetermined level after accepting the initial peak pulse.

Initially the reference level is set at a high point of 95% on the input waveform, but after the first pulse is received, the reference level is set to, for instance, a reference level of 60% of the waveform. This allows the output of the analog comparator to produce effective pulses even though the form of the input wave from the second differential amplifier is changing.

The signals at the outputs of the first and second differential amplifiers are repetitive for each revolution of the gas metering mechanism.

The passing of gas through the gas meter causes the proving bell either to evacuate, in pressure proving, or to fill, in vacuum proving, and the resultant linear movement of the proving bell is monitored by a pulse-producing encoder mounted on and operated by the proving bell.

By determining the number of pulses produced by the volume encoder for a given linear movement of the proving bell, a relationship between the number of pulses produced and volume of test gas displaced can be formulated.

By counting the pulses produced by the gas meter pressure sensing means and by predetermining the peak signals produced by one gas meter revolution, each gas meter cycle can be monitored; simultaneously the pulses produced by the testing bell encoder are totalized for any given number of gas meter revolutions or cycles of operation.

Therefore, by knowing the counts per gas meter cycle and the number of pulses produced by a volumetric bell displacement the gas meter calibration can be performed.

Another feature of this invention is the provision of improved electronic means for automatically and sequentially operating the valves which control the flow of test gas through the meter being tested, which means are sufficiently fast-acting to complement the rapidity with which a test can be completed by the methods and apparatus herein described.

As a result of the saving in time which the present invention has effected, one meter tester can make four or five times the number of tests which a tester could make in a given time period prior to this invention. Besides, for a given number of tests made per man-hour, fewer testing machines are required and the space presently occupied by the surplus machines can be used for other purposes.

When using the negative pressure method in which the flow of test gas is from the meter to the bell, the characteristic pressure fluctuations of the test gas being drawn in and through the meter are counted and recorded by the apparatus described below.

Other features and advantages will hereinafter appear.

In the accompanying drawings:

FIG. 1 is a schematic view of the arrangement of the proving apparatus using a proving bell to indicate the amount of test gas passing through the meter being tested under high and low flow rates referred to as "open" and "check" tests.

FIG. 2 is a schematic view showing one form of volume encoder which may be used in connection with the test bell pulley.

FIG. 3 shows the conduits and valves in the testing equipment with the three-way valve in leak testing position.

FIG. 4 is a schematic view showing the relationship between the gas meter transducer and the components for amplifying and shaping the waveform of signals received from the transducer including the volume encoder, the cycle counter, the counter and totalizer and the digital comparator.

FIG. 5 is a graph of a representative amplified train of pressure signal waveforms issuing from the transducer in one cycle of operation of the valve mechanism.

FIG. 6 shows the signal waveform peak detected and attenuated.

FIG. 7 shows the waveform of the signal after it has passed through the second differential amplifier.

FIG. 8 shows the peak detected signal.

FIG. 9 shows the approximate shape of the peak signal after peak voltage level has been lowered.

FIG. 10 shows the final shape of a waveform as it leaves the analog comparator.

FIG. 11 represents the waveform of the signals leaving the analog comparator in one cycle of operation of the valve mechanism of the meter and the signal received by the digital comparator from the volume encoder.

FIG. 12 is a function timing diagram showing the functions to be performed in the sixteen steps of the shift register in making the "open" test run and the "check" test run, and, by way of example, the length of the respective time periods in which function operations are performed under the control of the shift register.

FIG. 12a is a diagrammatic view showing the relationship of the various elements leading to the display devices.

Figure 13:
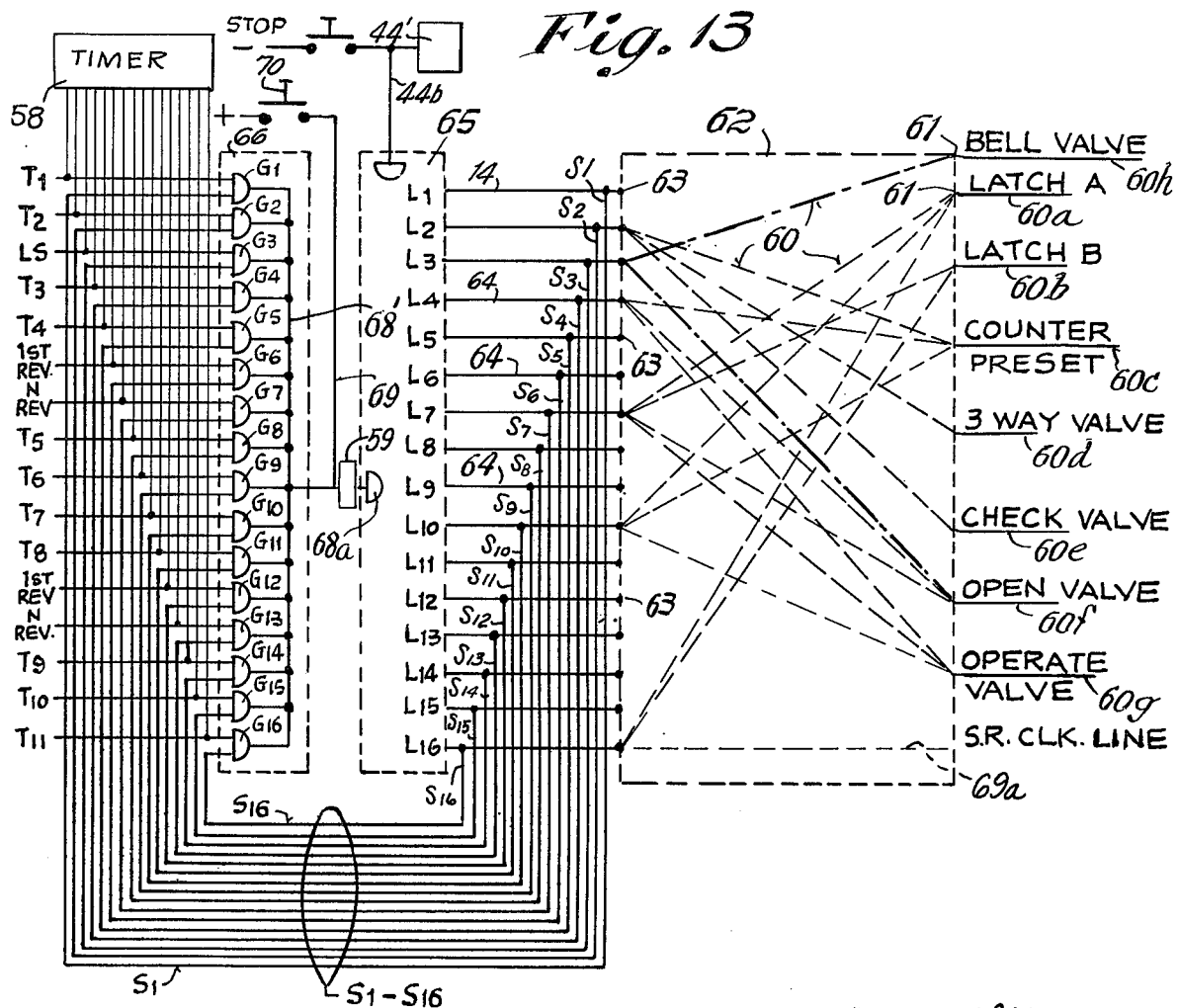
FIG. 13 is a diagrammatic view showing the function selectors, the function operating circuits, the shift register and the malfunction detecting circuits.

There are two methods of conducting tests by the prover bell, one using air forced from the bell, due to the weight of the body, and through the meter, and the other referred to herein by way of example in which gas is drawn in through the meter and exhausted in the bell as a counterweight on the prover descends by gravity.

Referring to FIG. 1, a conventional test gas tank 10 is provided with a bell 11 which rides within the tank and is guided by rails 12. The closed top of the bell is connected to a cable 13 which passes over a pulley 14 rotatably mounted on a platform 15 supported by the posts 12a. The other end of the cable 13 is connected to a weight 16 which acts as a counterweight for the bell. The bell rises and falls as test gas flows into the tank and bell or flows out respectively.

The bottom of the tank has a passage 17 connected to a vertical pipe 18 connected by one branch of a T-fitting 19 and pipe 20 to a "bell" valve 21, operated by solenoid 22. The valve 21 is connected by pipe 23 to a source of suction, not shown, or to a source of vacuum, not shown.

The other branch of the T-fitting 19 is connected by a pipe 24 to an "operate" valve 25 which is operated by a solenoid 26 and connected to a T-fitting 27 connected to a vertical pipe 28. The "operate" valve controls the flow of test gas between the tank and the meter.

The upper portion of the pipe 28 is connected by a T-fitting 29 and pipe 29' connected to a flexible tube 30, the other end of which is fastened in a fitting 31 adapted to be placed over and against one of the ports of a meter 32 to be tested.

The other port of the meter is engaged by a fitting 33 which is connected by a flexible tube 34 to a four-way fitting 35 connected to a normally closed "open" valve 36 operated by solenoid 37. The other arm of the four-way fitting 35 is connected by a pipe 38 and elbow 39 to a normally open "check" valve 40 operated by solenoid 41. The other sides of the valves 36 and 40 are open to the atmosphere.

Each of the fittings 31 and 33 is carried by an arm 42 pivotally and slidably mounted on a vertical rod 43 carried by a table or platform 44a on which the meter to be tested is supported at a convenient height. One side of a differential pressure gauge 44 is connected by pipe 45, elbow 46 and pipe 47 to fitting 35 and the other side of the gauge 44 is connected by a pipe 48, elbow 48a to a three-way valve 49 which is operated by a solenoid 49a. The three-way valve 49 is connected by elbow 29a and pipe 29b to the T-fitting 29, pipe 29' and flexible tube 30.

Prior to testing the meter for performance, in order to insure that the connections between the meter and the bell 11 are gastight, the pressure gauge 44 which normally indicates the differential pressure across the inlet and outlet ports of the meter is used. When the connections are to be tested, the three-way valve 49 is adjusted, as shown in FIG. 3, in which test gas passes through the pressure gauge 44, a pipe 48 through the three-way valve 49, elbow 49c, pipe 49b and the fitting 19 to the port 17 at the underside of the bell, the gauge 44 being cut off from the meter tube 30 by the three-way valve.

When the "check" test valve 40 is closed and the "operate" valve 25 is opened for a predetermined period of time to permit the pressure in the bell and the meter to equalize via the pipe 24, through "operate" valve 25 to the pipe 28, fitting 29 and flexible tube 30 to the fitting 31 on the meter, through the meter fitting 33, flexible tube 34, fitting 35, and pipes 47 and 45 to the other side of the pressure gauge 44, then the "operate" valve 25 is closed and the "check" valve 40 remains closed. If the meter pressure changes beyond a predetermined amount, an alarm 44' would be activated by the pressure gauge and this would indicate that the connections between the meter and the bell were not gastight and the test should be stopped to correct the fault.

As shown herein, the testing apparatus is arranged to test the meter by the vacuum method in which test air at atmospheric pressure is taken into and passed through the meter due to the suction created by the test bell.

If there is no indication of leakage existing, then the normally open "check" valve 40 is opened and the "bell" valve 21 is opened to allow the test air to escape from the bell until a lug 14a on the pulley 14 engages a limit switch 14b supported on the top 15 of the bell structure. The limit switch 14b opens the circuit to the solenoid 22 which operates the "bell" valve 21.

It is the practice in the industry to make at least two test runs with each meter. One is an "open" test with the valves 36 and 40 open to the atmosphere and the other test run is a "check" test made with the normally closed "open" test valve 36 closed and the normally open "check" valve 40 open, thus reducing the rate of flow of test gas passing through the meter.

Connected to the T-fitting 27 is a pipe 50, elbow 51, and bypass valve 52 operated by solenoid 53. Connected to the bypass valve 52 is a pipe 54 and a T-fitting 55 in the exhaust pipe 23.

In order to measure the amount of test gas passing through the meter during a test run, the pulley 14 operated by the bell is connected to a rotary encoder referred to below which may be of any suitable type.

When the meter has made a predetermined number of cycles of operation, the volume of test gas which has passed through the meter during the "open" test is displayed to the operator and the accuracy or the degree of inaccuracy of the meter can be determined.

When gas at the lower rate of flow is to be tested, the normally closed "open" valve closes and the normally open "check" valve remains open.

In the broader aspects of this invention any suitable means for operating the valves above referred to in proper sequence may be used, for instance the electromechanical valve sequence apparatus shown in U.S. Pat. No. 3,035,434. However, as will appear below, the time required for conducting the tests has been so substantially reduced by the method and apparatus of the present invention, that the time saved thereby would be substantially lost if the method and electromechanical apparatus of said patent were employed to control the sequence of the operations in the tests.

Hence, an important feature of this invention is the provision of electronic means for sequentially initiating and performing the various functions in testing a meter including the opening and closing of the various valves between the atmosphere and the volume measuring bell on the one hand and between the bell and the meter on the other hand.

Figure 14:
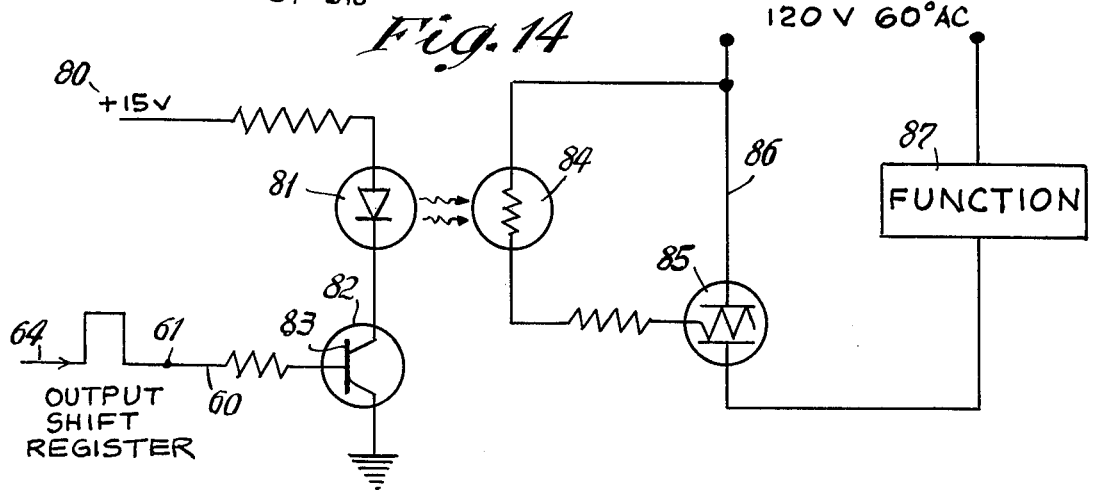
FIG. 14 is a schematic view of one form of drive circuit responsive to a signal from the shift register to initiate the operation of one of the function performing means.

The means for performing the functions required in connection with testing a meter, according to the present invention, comprises a timer 58 diagrammatically illustrated in FIG. 12, a clock 59 which provides a negative pulse to step a shift register 65 and a plurality of function drive circuits 60a to 60h (see FIGS. 12 and 13), one of which is shown by way of example in FIG. 14. The circuits 60a to 60h are connected to outlets 61 of a function selector 62 which may comprise a diode matrix having inlets 63 connected by leads 64 to outlets L1 to L16 inclusive of a sixteen stage shift register 65.

Before proceeding with the description of the function selection and operation, attention is called to FIG. 12 which is a function timing diagram showing a list of the functions to be performed by the drive circuits 60a to 60h and showing by dotted lines in numbered vertical columns the 16 steps of the shift register 65 shown in FIG. 13. The steps represented in FIG. 12, except for the third step, sixth and seventh steps and 12th and 13th steps, are each controlled by the timer 58 and are identified by the time periods T1 to T11.

The third step marked "LS," is terminated when the limit switch 14b on the test bell indicates that the test bell is positioned to start the test. In the sixth step marked "1st Rev." the meter is running and the first rotation of the valve mechanism of the meter has been sensed. The seventh step marked "N. Rev." is terminated when the meter valve mechanism has made a predetermined number of revolutions in the "open" test. In the twelfth step marked "1st Rev." the meter is being sensed in the "check" test and the thirteenth step marked "N. Rev." is terminated when the meter has made a predetermined number of revolutions in the "check" test. Referring again to FIG. 12, the average duration of the periods of time in which the functions are severally performed are indicated in seconds in blocks 68 and by the shaded blocks 69.

Assuming that the fitttings 31 and 33 have been applied to the ports of the meter, that the shift register and function performing circuits are energized, in the first step represented in the function timing diagram of FIG. 12 having a time period T1 of 10 seconds (all times stated are average times): the threeway valve 49 is positioned as shown in FIG. 3 to connect the meter and the test bell to the differential pressure gauge 44; the normally open "check" valve 40 is closed; the "operate" valve 25 is opened and the system is tested for leakage. If during the second step the reading of the pressure gauge indicates that there is leakage of test gas between the meter and the test bell, the pressure gauge 44 activates the alarm 44' and opens the energizing circuit 44b (FIG. 13), the test is stopped and the shift register is reset. The operator must then readjust the fittings 31 and 33 and otherwise eliminate the leakage as pointed out above.

If there is no leakage, at the end of the second step, the three-way valve 49 is shifted to its FIG. 1 position, the normally open "check" valve is opened and the "bell" valve 21 is opened to feed test gas to the bell or extract air therefrom depending on the mode of making the test.

When the test bell 11 is in a predetermined position, limit switch 14b on the bell is closed by lug 14a on the pulley 14 and this terminates the third step of the shift register by the closing of the "bell" valve 21.

At the end of the third step the circuit 60h is energized and "bell" valve 21 is thereby closed, and when the fourth step (T3) is reached, the circuit 60f of the normally closed "open" test valve 36 is opened, and the circuit 60g to the "operate" valve 25 is opened. The operation of proving the meter begins after a period of about 5 seconds which allows time for damping any oscillations in pressure which may be caused by opening and closing the valves 25 and 36.

No change is made in the fifth step.

In the sixth step marked "1st Rev." the first revolution signal in the "open" test is received from the meter.

In the seventh step marked "N. Rev." the operation of detecting the peak pressure fluctuations which occur in the meter takes place, as will be explained below, the present counter circuit 60c is disabled. At the same time latch A for the "open" test optical display 125 and latch B for the "check" test optical display 125' are disabled, see FIGS. 12 and 12a, by the circuits 60a and 60b disabling the gates G1 and G2 respectively.

The period in which the actual "open" test is made, i.e., fifth, sixth and seventh steps, lasts for about 20 seconds during which the cycles of the meter valve mechanism are taking place and being counted by the cycle counter 111.

At the end of the seventh step the circuit 60f to the "open" test valve 36 is closed and thus closes the valve 36 which remains closed for the remainder of the test. In the eighth step the counter readout takes place and the latches A and B are enabled, by the circuits 60a and 60b respectively, and gates G1 and G2 to transfer the count from the counter and totalizer 122 to the optical displays 125 and 125' respectively, and that is the end of the "open" test run.

In the ninth step the latches A and B are again disabled.

In the tenth step circuit 60b for the latch B is enabled and latch A remains disabled for the rest of the test. The circuit 60c for "present counter" is enabled in the 10th step and remains enabled until the end of the 12th step, marked "1st Rev.", indicating that the first revolution of the meter during the "check" test has been sensed. At the end of the twelfth step the circuit 60c is opened and the present counter is disabled.

At the beginning of the 13th step the latch B is disabled by closing the circuit 60f and the preset counter circuit is disabled. At the end of the 13th step the circuit 60g is opened closing the "operate" valve 25.

In the 14th step the latch B is enabled and the latch A remains disabled so that the count of the "check" test can be transferred to the optical display 125'. During the 15th step the latch A remains disabled and the latch B is disabled.

At the end of the sixteenth step the latch A and the latch B are disabled and the shift register goes to null.

From the above it will be seen that the operation of testing for leaks, making the "open" test, and making the "check" test according to the present invention occupies approximately 85 seconds as against 4 minutes required heretofore to make the same kinds of tests.

It should be noted here, the purpose of the test being to compare the performance of the meter with an established optimum degree of accuracy, that any disparity between the optimum performance and that actually performed during the test can be discovered by comparing the volume of test gas delivered during the predetermined number of cycles of operations of the meter with a known standard volume for which the meter was constructed. It has been found advantageous to operate the test for a determinate number of cycles of operations of the valve mechanism of the meter. To this end, in the preferred form of this invention, as pointed out below, means are provided for terminating the test when the meter has made a predetermined number of cycles of operation and comparing the volume displayed by the optical displays 125 and 125' against a known standard volume.

As stated above and as shown in FIG. 13, the drive circuits 60a to 60h are energized by the function selector 62 which is preset to connect the desired function drive circuit or circuits 60 which are activated in the various stages of the shift register 65 which has, in the present embodiment, 16 stages corresponding to the 16 steps of the timer, the steps of which are represented by the diagram, FIG. 12.

To start the cycle, a starter switch 70 connected to a positive current source, +, is employed. Starter switch 70 is initially in closed position. Opening the switch 70 causes a surge of negative current to pulse into stepper terminal 68a via lead 69. Shift register 65 which is reset after each completed cycle (and thus reset before each new cycle) receives the step signal and energizes (turns on) output terminal L1. The ON signal of L1 is transmitted simultaneously to function selector 62 and to lead S1. The signal from S1 enters AND gate G1 together with input T1. Timer 58, as shown in FIG. 12, keeps T1 ON for approximately 10 seconds. G1 has an ON output as long as L1 via S1 and T1 are both ON. The ON output from AND gate G1 has no effect on stepper terminal 68a which steps the shift register only when it senses a negative pulsed signal. L1 will remain ON. When timer 58 turns T1 OFF after 10 seconds, AND gate G1 turns OFF. This causes a clock 59 to pulse the negative current to stepper 68a which shifts the shift register 65 to the position of output terminal L2 from output terminal L1. L2 is now ON; L1 is now OFF. The L2 signal follows a sequence similar to that of L1. This step-shifting continues until output terminal L16 is turned ON at which point the system stops and resets to the L1 position. L1 through L16 will thus be energized in seriatim for predetermined time periods T1 to T11 (set by timer 58) and for variable controlled periods LS, 1st Rev, N. Rev. in the "open" test and 1st Rev, N Rev in the "check" test.

The output terminals L1 to L16 of the shift register 65 are connected by circuits 64 to input terminals 63 of the function selector 62. However, the shift register circuits 64, according to the present invention, are not energized unless the step of the timer 58 is in the same step as the shift register 65.

For this purpose the present invention provides a malfunction preventing arrangement in which shift register output circuits 64 are respectively connected by leads S1 to S16, each leading to a related AND gate G1 to G16 of ganged AND gate network 66 connected respectively to leads T1, T2, LS, T3, T4, 1st Rev., N. Rev., T5 to T8, 1st Rev., 2nd Rev., T9 to T11. The outputs of the AND gates G1 to G16 are each connected to a common lead 68'. The output of the AND gates 66 (G1 to G16) are each made conductive, the companion circuit 64 from the shift register is energized and the related function is or functions are performed.

This arrangement prevents malfunctioning in the following way. If the timer 58 skips a stage, no input to the function selector 62 will occur. For example, if the timer 58 goes to T3 from T1, AND gate G1 will turn OFF and stepper terminal 68a will shift the shift register 65 to L2. One input then to AND gate G2 will be carrying a signal (from L2 via S2) and only one input to AND gate G4 (from T3) will be present. Neither gate G2 nor gate G4 will be conducting. The system will be stopped. Also, if T2 is erroneously energized while L1 and T1 are ON, G1 will remain ON, as will L1. Because L2 must be OFF when L1 is ON, no signal will travel via S2 to AND gate G2. G2 will remain OFF and the function selector 62 will receive no signal from output terminal L2. Only functions connected to output terminal L1 will be energized.

In essence, the malfunction arrangement of FIG. 13 requires that there be an ordered cycle of selected functions. L2, the output terminal to function selector 62 will not remain ON unless timer 58 has turned T2 ON. If T2 is OFF, L2 is OFF. And, conversely, as shown in the examples above, where the timer 58 is in error in the time sequencing, there will be no output terminal errors.

After the cycle is completed, the terminal 69a of the reset circuit of the shift register is energized and the shift register is returned to starting condition in which it remains until the starter switch 70 is again operated.

It should be understood that the lines 60a to 60h shown in FIG. 13 between the shift register terminals L2, L3, L4, L7 and L16 and the related function driving circuit terminals 63 are representative of the manner in which the other companion terminals are interconnected and that the connection lines of several of the other circuits are omitted merely to avoid confusion.

In the form of the invention herein illustrated by way of example, there are only nine function drive circuits 60 while there are 16 time periods and shift register stages. This is because several of the functional operations extend over several time steps as indicated by the brackets in FIG. 13.

The duration of each of the time steps is controlled by the clock 59 except for step three which is terminated by the limit switch 14b on the bell frame, step six which is terminated by the shift register going to the seventh step when the first significant signal is received from the pulse sensing means referred to below, step 7, step 11, and step 12. Likewise in the seventh step of the time controlled function selector 62, the valve mechanism makes N revolutions. The eighth and ninth steps are of short duration and are passed through substantially instantaneously. Step eight marks the end of the "open" test while step nine disables the latch A to display the count in the counter and totalizer 122 of the result of the "open" test. In step 10 the revolution counter is enabled to terminate the "check" test when the meter valve mechanism has made a predeterminate number of cycles of operation.

At this point it may be noted that in the broader aspects of this invention any suitable drive circuit may be employed to furnish the power for performing the functions. However, it has been found that an electronic relay is best suited for the purpose. Such a relay is shown in FIG. 14 in which the output of the function selector 62 for each of the function performing devices may comprise a D.C. source 80 of low voltage fed to a luminous diode 81 and transistor 82 to ground. The base 83 of the transistor 82 is connected to one of the function leads 60. The light from the diode 81 impinges on a photodetector 84 which enables a triac gate 85 in an A.C. power circuit 86 connected to and energizing the function performing device represented by block 87.

As stated above, an object of this invention is to provide methods and means for proving positive displacement, diaphragmoperated gas meters. Such meters are provided with valve mechanism for controlling the flow of gas from the inlet through the displacement chambers to the service outlet. The valve mechanism operates by means known as a "tangent" which drives the index mechanism and which is adjustable and must be adjusted if the proof of the meter is not accurate in both the "open" test and "check" test runs. This is done by reaching through a hand hole in larger meters, or in a small meter through a small hole through which a tool may be extended to make the adjustment.

The proof of a meter was heretofore made by comparing the reading of the meter index optically or automatically with the known quantity of test air which has passed through the meter during each of the test runs.

It required two cubic feet of test air to prove a meter in the prior method of testing and would take about four minutes, whereas with the method and apparatus of the present invention only a fraction of the time, approximately 80 seconds, is required to make the tests. This is because it is not necessary according to the present invention to depend upon the index of the meter to obtain a reading and only a fraction of the amount of test air is required to complete the tests. We have discovered that in each cycle of operation of the meter under test, due to the valve action of the meter, the air pressure between the inlet port and the outlet port of the meter fluctuates so that one or more voltage peaks are produced and reproduced in each reoccurring cycle. The pattern of the voltage peaks is substantially the same for each meter of the same size and class. Stated differently, all meters of the same size and style made by a manufacturer will produce essentially the same pattern of voltage peaks in each cycle of operations of the meter. For instance, in a three chamber meter of a certain size there may be one voltage peak for each cycle of the valve mechanism while in a meter of four chambers there may be three, four or more voltage peaks to a cycle of the meter operation.

The prover of the present invention as disclosed herein is intended for general utility for testing meters from the assembly line of a manufacturer or from various manufacturers that are removed from service for testing.

We have found that by providing a sampling circuit which senses one or more of the voltage peaks of the pressure fluctuations which occur and are repeated in each cycle of operations of the meter, counting pressure fluctuations, measuring determinate units of volume of test gas passing through the meter during the test run and comparing the pulse count with the volume count, the accuracy or the degree of inaccuracy of the meter can be determined.

Referring to FIG. 4, the sampling circuit of the present invention comprises a transducer 100, which may be of the resistance bridge type, which is connected by flexible tubes 30a and 30b to the fixtures 31 and 33, see FIG. 1, which engage the inlet and outlet ports respectively of the meter.

The fluctuations of the test air pressure caused by operation of the valve mechanism of the meter which are applied to a transducer 100, FIG. 4 during the operation of the meter under test, results in a series of electrical signals of varying voltages being fed through the leads 101 to a differential amplifier 102 which increases the voltage level of the signals received from the transducer 100 to usable strength to provide a signal A schematically shown in FIG. 5. The signal A is fed to a peak detector 103 which sends a signal to an attenuator 104 which produces and maintains the signal B at a level of voltage equal to a fraction of the maximum amplitude of the undulating signal at its input terminals as shown in FIG. 6.

From the attenuator 104 the signal B is passed to a second differential amplifier 105 which also receives a signal A via lead 106 from the first differential amplifier 102 and amplifies the difference between the signals A and B. The resulting signal C (see FIG. 7) is fed to a second peak detector 107 which passes a signal D (see FIG. 8) to a second attenuator 108.

As illustrated in FIG. 9, the attenuator 108 lowers the level of voltage response to accommodate signals having peak levels which may vary slightly from the greatest peak in each of the cycles of operations of the meter.

Signals E from the second attenuator are fed via lead 109 to analog comparator 110 which at the same time receives a signal C via line 109' from the differential amplifier 105. When the amplitude of the signal C exceeds that of the signal E the signal F is produced.

Since there may be more than one peak voltage signal occurring in each cycle of operations of the meter depending on the construction and mode of operation of the meter being tested, the output of the analog comparator 110, as shown in FIG. 11, may consist of a plurality of peak voltage signals F for each cycle of operations of the meter. However, in testing another meter of different make or size, there may be a different number of peak voltage signals per revolution.

From the analog comparator, signals F are fed to a cycle counter 111 and if there are more than one signal F, produced in a cycle of operations without providing for this, the reading of the cycle counter would be false. Therefore, to permit the same test equipment to be used for different makes or sizes of meters, the present invention provides for feeding signals from a digital comparator 112 which prevents more than one signal F per revolution of the valve mechanism from being recorded in the cycle counter. For the purpose of permitting the passage of only one of said plurality of signals F to the cycle counter 111, the digital comparator 112 has a manually adjustable knob 113 which can be set by the operator according to the known number of volume controlled signals that are produced in the particular meter being tested in each cycle of the meter.

To determine the volume of test gas which has passed through the meter during the test, there is attached to the pulley 14 of the bell unit 11, see FIG. 1, an optical encoder 114 diagrammatically illustrated in FIG. 2. The encoder 114 includes a radiant source 115, a radiant energy-responsive cell 116, a source of current 117 and a slotted plate 118 interposed between the said source and the cell 116 and connected to the pulley 14 so that each increment of movement of the bell 11 will cause the pulley 14 and the encoder plate 118 to rotate to produce signals G represented by the lines G' in FIG. 11. The signals so produced are passed via leads 119 and 120 to the digital comparator 112. When the number of signals G as predetermined by the position of the settable control knob 113 are received by the digital comparator 112, the cycle counter 111 via lead 121 is enabled to accept from the analog comparator 110 one signal F of the group of signals F'.

The cycle counter 111 is connected to the combined counter and totalizer 122 by lead 123. When a predetermined number of signals F has been received by the cycle counter 111, which number is determined by setting adjustable knob 124, the counting operation is stopped.

Each time that the cycle counter passes a signal to the counter and totalizer 122, it passes a signal via lead 121a to the digital comparator to reset the same to zero.

It has been found that in connection with the attenuator 108 which is just before the analog comparator 110 in the output of amplifier 105, the amplitude of the peak of the waveform representing a cycle of operations may vary in amplitude by several volts. To insure that the analog comparator 110 produces a signal each and every time for the same peak output of amplifier 105, the level of signal E from attenuator 108 is reduced further to a predetermined level after accepting the initial peak pulse. Initially, the reference level is set at a high point—95% of the input waveform. After the first pulse is received, the reference level is set to say a level of 60% of the waveform. This allows the output of analog comparator 110 to produce effective pulses even though the form of the input wave from the last peak detector amplifier is changing in amplitude.

While it is more convenient in most cases to connect the transducer across the inlet and outlet orifices of the meter, where it is not convenient, the tubing 30a and 30b may be placed elsewhere in communication with the test gas flowing to and from the meter.

Summarized, the features of this invention which contribute to the efficiency of the method and apparatus disclosed herein result in part from: the sensing of the pressure pertubations in the test gas passing through the meter; the conversion of said pertubations into varying voltage signals; the converting of said varying voltages into discrete voltage pulses concurrent with maximum pressure pertubations; counting the number of cycles of operation of the meter by means of said voltage pulses; and enabling and disabling volumetric counting apparatus to determine by means of said voltage pulses, the volumetric displacement of said meter during a proofing test.

Variations and modifications may be made within the scope of the claims and portions of the improvements may be used without others.

We claim:

1. The herein described method of proving a positive displacement, diaphragm-operated gas meter having metering mechanism and a prover bell which comprises the steps of causing test gas to flow through said meter and in said prover bell; causing said metering mechanism to operate through a predetermined number of cycles of operation and during such operation sensing resultant internal pressure fluctuations of said test gas in the meter which fluctuations are manifested as a family of pressure waves, which reoccurs during each cycle of operations of the metering mechanism; converting said pressure waves into a train of electrical signals of varying voltages; amplifying said signals; detecting and holding peak signals occurring during each cycle of operation of said metering mechanism; counting the number of said peak signals until a predetermined number of said peak signals has been received; and simultaneously signaling an encoder on said prover bell to record the volume of test gas which has passed through said meter during said predetermined number of cycles of operation to determine the proof of the meter.

2. The method as defined in claim 1 which includes the step of amplifying by a first differential amplifier said train of signals, amplifying and feeding said signals to a first peak detector, and passing said detected signals to an attenuator to produce attenuated peak signals.

3. The method as defined in claim 2 which includes the steps of passing said attenuated peak signals and the output of said first peak detector to a second differential amplifier which amplifies the difference between said peak signals from said first differential amplifier and the attenuated peak signals from said first peak detector.

4. The method as defined in claim 3 which includes the steps of feeding the output of said second differential amplifier to a second peak detector and from the latter to a second attenuator, and feeding the output of said second attenuator along with the output of said second differential amplifier to an analog comparator and from the latter to a cycle counter.

5. The method as defined in claim 4 which includes the steps of causing the prover bell to operate an encoder to produce one signal for each predetermined unit of volume of test gas passing through the meter and feeding said signals to a digital comparator.

6. The method as defined in claim 5 in which a signal from the defined comparator is sent to a cycle counter to enable the latter to pass a signal to a counter and totalizer.

7. In apparatus for use in proving a positive displacement, diaphragm-operated gas meter having metering mechanism comprising a fluid pressure transducer responsive to the test gas flowing through the meter to sense a train of pressure waves which occur and reoccur in each cycle of operations of the metering mechanism in a test run to produce signals of various voltages, including one or more characteristic peak voltage signal in each train of signals depending on the form of the meter being tested; means for amplifying the signals of each train of signals issuing from said transducer; means for detecting and amplifying said characteristic peak voltage signals; means for shaping said signals; and counting means for counting one of said characteristic peak voltage signals from each of said train of signals received in each cycle of operations of the meter.

8. Apparatus as defined in claim 7 in which there are means for measuring the volume of test gas passing through the meter during a test run comprising a test bell and conduit means for connecting said test bell and meter for passage of test gas between the bell and the meter, a volume encoder operated by the movement of the test bell and including means for producing a volume-indicating signal in the form of an electric pulse each time the volume of test gas in the bell changes a predetermined amount during the test run; and means for counting and totalizing said electrical pulses to determine the total volume of test gas which passed through the meter during the test run.

9. Apparatus as defined in claim 8 in which there are means for terminating the test run after a predetermined number of cycles of operation of the valve mechanism has been counted by said cycle counting means.

10. Apparatus as defined in claim 8 in which there are means for displaying the volume of test gas which has passed through the meter during said test run so that it can be compared with the known volume of test gas which the meter was designed to pass during said predetermined number of cycles of operation of the valve mechanism.

11. Apparatus for testing a positive displacement, diaphragm-operated gas meter having a test bell, conduit means between the test bell and one port of the meter being tested including an "operate" valve, conduit means between the other port of said meter and the atmosphere comprising a normally open "check" test valve for use in making a "check" test run and a normally closed "open" test valve for use in making an "open" test run, function performing means including means for operating said valves to change their states: the improvement comprising preset means for controlling said function performing means step-by-step including function selectors for controlling the sequential energization of said function performing means, timing means for energizing the function selectors step-by-step in predetermined order and a shift register having circuits leading to said function performing means to be selectively activated at the respective steps of the shift register.

12. Apparatus as defined in claim 11 in which said timing means for energizing certain of said function selectors includes a clock for controlling said shift register.

13. Apparatus as defined in claim 11 in which said timing means for energizing certain of said function selectors includes a clock for controlling said shift register, and means responsive to the completion of certain functions by said function performing means for initiating the operation of the next function performing means.

14. Apparatus as defined in claim 11 in which there are malfunction detecting means between said function selectors and said shift register for enabling the shift register circuits only when the latter are in step with the timing means.

15. Apparatus as defined in claim 11 in which there are leak test conduit means between the one port of the meter and the other port and there is a pressure gauge inserted in said leak test conduit means, and valve means to connect said leak test conduit means to said "operate" valve; conduit means between said bell and said leak test conduit means including a three-way valve which in one position connects the conduit connected to the one port of the meter and said test conduit, and in the other position connects said conduit leading to the "operate" valve to said conduit attached to the meter, and there are function performing means for operating said three-way valve under the control of said function selectors.

16. Apparatus as defined in claim 13 in which there are malfunction detecting means between said function selectors and said shift register to enable the shift register circuits only when the latter are in step with the timing means.

17. Apparatus as defined in claim 11 in which there is a "bell" valve for preparing the test bell for meter proving and said function performing means includes means for operating said "bell" valve to change its state, said functional selectors including a selector for activating said last-named function performing means.

18. Apparatus as defined in claim 11 in which there is a cycle counter for counting the cycles of operations of the valve mechanism of the meter in an "open" test run, and display means for displaying the volume of test gas which passed through the meter during a predetermined number of cycles of operations of said valve mechanism of the meter constituting said "open" test run, one of said function selectors controlling a circuit to cause said display means to display said volume at the end of said "open" test run.

19. Apparatus as defined in claim 11 in which there is a cycle counter for counting the cycles of operations of the valve mechanism of the meter in a "check" test run, and display means for displaying the volume of test gas which passed through the meter during a predetermined number of cycles of operations of said valve mechanism constituting said "check" test run, one of said function selectors controlling a circuit to cause said count to be displayed at the end of said "check" test run.

20. Apparatus as defined in claim 19 in which there are means for causing said cycle counter to count the cycles of operations of the valve mechanism of the meter in an "open" test run, a second display means for displaying the volume of test gas which passed through the meter during a predetermined number of cycles of operations of said valve mechanism of the meter occuring during said "open" test run, one of said function selectors controlling a circuit to cause said display means to display said volume at the end of said "open" test run.

21. In apparatus for proving a positive displacement, diaphragm-operated fluid meter having metering mechanism, and inlet and outlet ports comprising a fluid pressure transducer in communication with said inlet and outlet ports of the meter and responsive to the pressure fluctuations which occur and reoccur in each cycle of operations of said metering mechanism and convert said pressure fluctuations to signals of varying voltage; means for amplifying said signals; means for amplifying and shaping a series of peak waveforms occurring in each cycle of operations of said metering mechanism, including at least one peak voltage waveform; a cycle counter; an analog comparator to pass to said cycle counter one of said peak waveform signals of said series of waveform signals occurring in each cycle of operation of said metering mechanism; a test gas volume encoder for producing a series of signals, one for each predetermined volume of test gas passing through the meter; a digital comparator; a counter and totalizer; and means, including said digital comparator, for passing one of said signals from the cycle counter to said counter and totalizer in each cycle of operation of the metering mechanism of the meter.

22. Apparatus as defined in claim 21 in which there are means for discontinuing the test when said cycle counter reaches a preset count.

23. Apparatus as defined in claim 21 in which the digital comparator is adjustable to pass to the cycle counter one signal from each group of signals received by it in each cycle of operations of the valve mechanism of the meter.

24. Apparatus as defined in claim 21 in which the cycle counter is adjustable to pass to the counter and totalizer one signal of each group of signals received by it in each cycle of operations of the valve mechanism of the meter.

25. In apparatus for use in proving a positive displacement, diaphragm-operated gas meter having adjustable index-operating mechanism comprising a gas pressure transducer in communication with the interior of said meter and responsive to pressure fluctuations which occur and reoccur in each cycle of operations of the meter and converting said fluctuations to signals of varying voltages; a first differential amplifier connected to said transducer to increase the amplitude of said signals; a first peak detector to which amplified signals are passed; a first attenuator to reduce the amplitude of said signals coming from said first peak detector; a second differential amplifier; means for feeding the signals passing from said first differential amplifier and signals passing from said first attenuator to said second differential amplifier; a second peak detector; means for feeding signals passing from said second differential amplifier to said second peak detector; a second attenuator; means for feeding signals passing from the second peak detector to said second attenuator; an analog comparator; means for feeding signals passing from said second attenuator and from said second differential amplifier to said analog comparator; a revolution counter; means for conducting signals from said analog comparator to said cycle counter; a volume encoder; a digital comparator; means for feeding signals from said volume encoder to said digital comparator; a counter and totalizer; and means for feeding signals from said digital comparator to said revolution counter to enable the latter to feed a signal to said counter and totalizer.

26. Apparatus according to claim 25 in which there are means for displaying the count of said counter and totalizer comprising optical display means, and latch means for causing the count of said counter and totalizer to be displayed by said optical display means.

27. Apparatus according to claim 25 in which there are means for displaying the count of said counter and totalizer in a first test comprising optical display means, and latch means for causing the count of said counter and totalizer in said first test to be displayed by said optical display means; and second means for displaying the count of said counter and totalizer in a second test comprising a second test optical display means, and second latch means for causing the count of said counter and totalizer in said second test to be displayed by said second display means.

28. The herein described method of proving a positive displacement, a diaphragm-operated gas meter having metering mechanism and a test bell; means communicating with the interior of the meter including means connected to said inlet and outlet ports for sensing the fluctuations of pressure of the test gas occurring in the meter in a cycle of operation of the meter, and reoccurring during each cycle of operations of said meter, thereby producing a train of varying voltages which repeat in each cycle of operations; amplifying said train of signals; detecting and holding a peak signal or peak signals occurring in each signal train; simultaneously measuring the volume of test gas passing through the meter and relating said volume of test gas to a cycle or cycles of operation of the meter; and converting such relationship to an indication of the degree proof.

29. The method of proving a positive displacement, diaphragm-operated gas meter which includes the step of determining the number of cycles of operations of the valve mechanism of the meter which occur during a test by sensing pressure fluctuations in test gas passing through the meter.

30. The method of proving a positive displacement, diaphragm-operated gas meter according to claim 29 which includes the step of converting said pressure fluctuations to signals of varying voltages.

31. The method of proving a positive displacement, diaphragm-operated gas meter according to claim 30 which includes the step of converting said signals of varying voltages to discrete voltage pulses concurrent with maximum pressure fluctuations.

32. The method of proving a positive displacement, diaphragm-operated gas meter according to claim 31 which includes the step of determining the number of cycles of operations of the valve mechanism of the meter by counting the voltage pulses.

33. The method of proving a positive displacement, diaphragm-operated gas meter according to claim 32 which includes the steps of enabling and disabling a volumetric counting device to determine by said voltage pulses, the volumetric displacement of said meter during a test.

* * * * *

UNITED STATES PATENT OFFICE
CERTIFICATE OF CORRECTION

PATENT NO. : 3,937,048
DATED : February 10, 1976
INVENTOR(S) : Theodore A. St.Clair et al It is certified that error appears in the above-identified patent and that said Letters Patent are hereby corrected as shown below:

Column 1, line 40, after "of" insert --the parts of--.
Column 7, line 30, "LS" should read --$LS_1$--.
Column 8, line 22, before "the" insert --and--;
       line 23, "present" should read --preset--;
       line 46, "present" should read --preset--;
       line 51, "present" should read --preset--.
Column 11, line 14, "diaphragmoperated" should read --diaphragm-operated--.
Column 14, line 39, "defined" should read --digital--.

Signed and Sealed this fourth Day of May 1976

[SEAL]

Attest:

RUTH C. MASON
*Attesting Officer*

C. MARSHALL DANN
*Commissioner of Patents and Trademarks*